(No Model.) 4 Sheets—Sheet 1.
G. VAN WAGENEN.
MACHINE FOR DUMPING SUGAR WAGONS.
No. 499,265. Patented June 13, 1893.
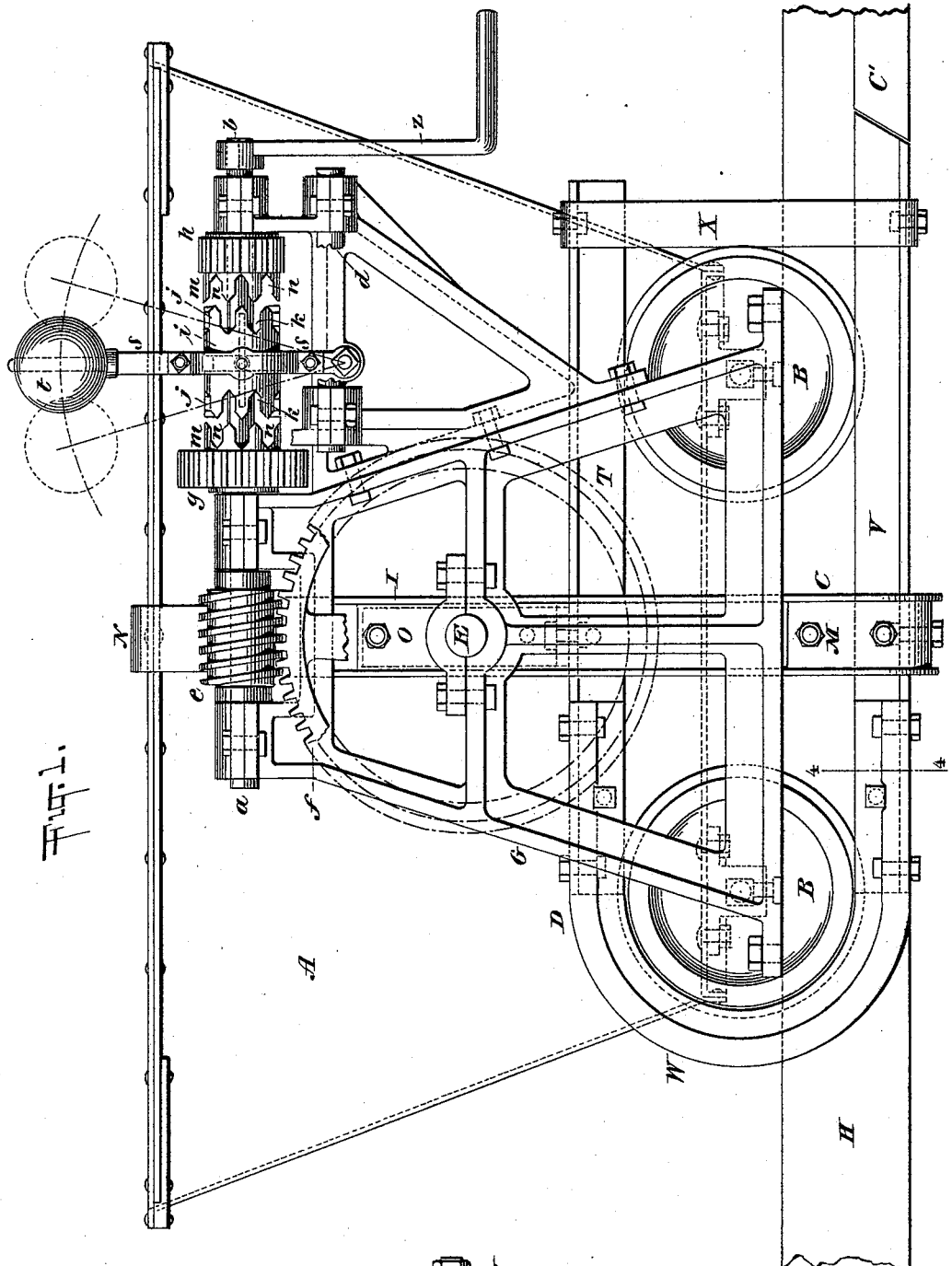
Fig. 1.
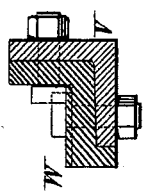
WITNESSES:
INVENTOR
George Van Wagenen,
BY
Chas. L. Gill
ATTORNEY.

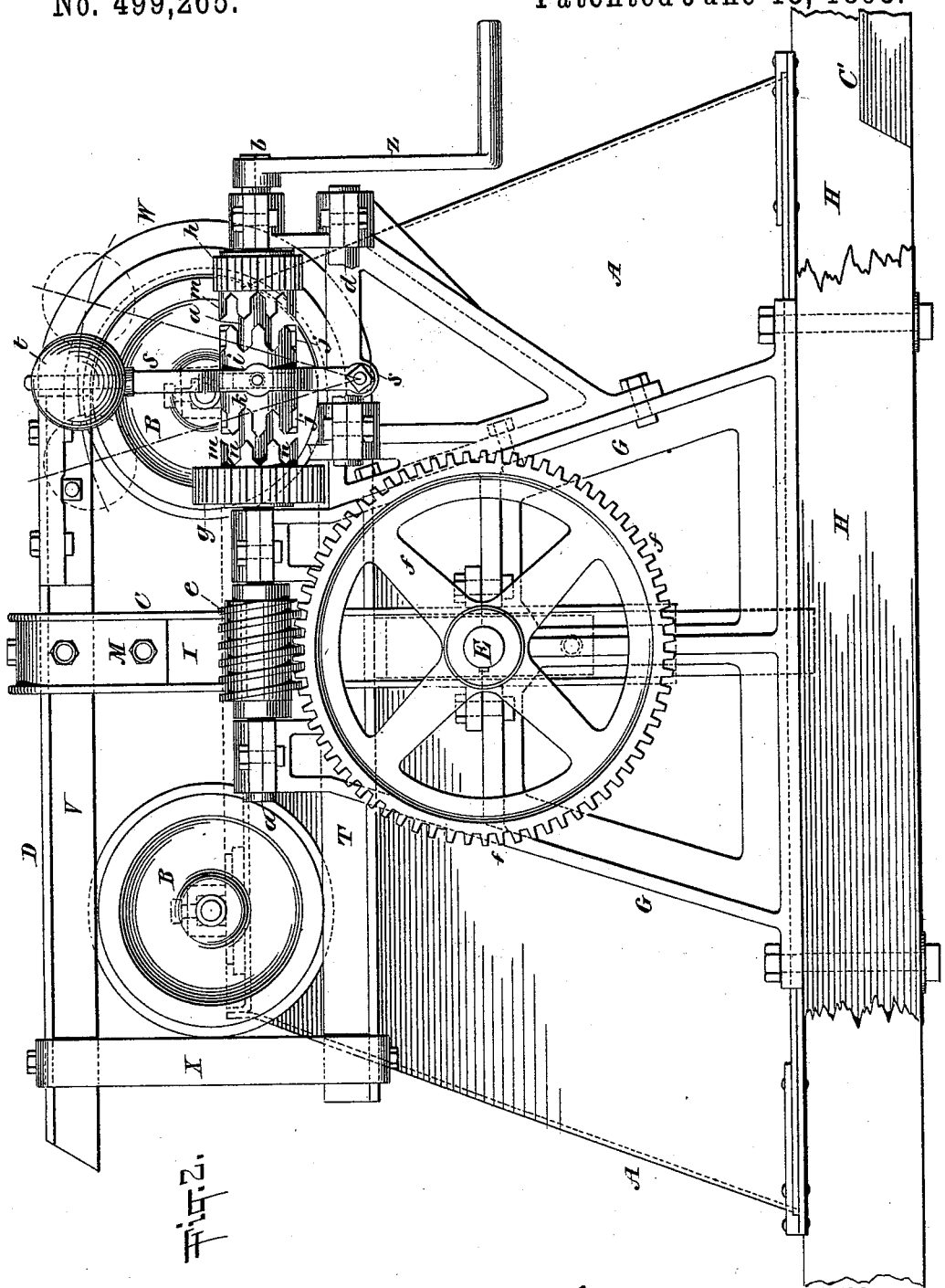

(No Model.) 4 Sheets—Sheet 3.
G. VAN WAGENEN.
MACHINE FOR DUMPING SUGAR WAGONS.
No. 499,265. Patented June 13, 1893.
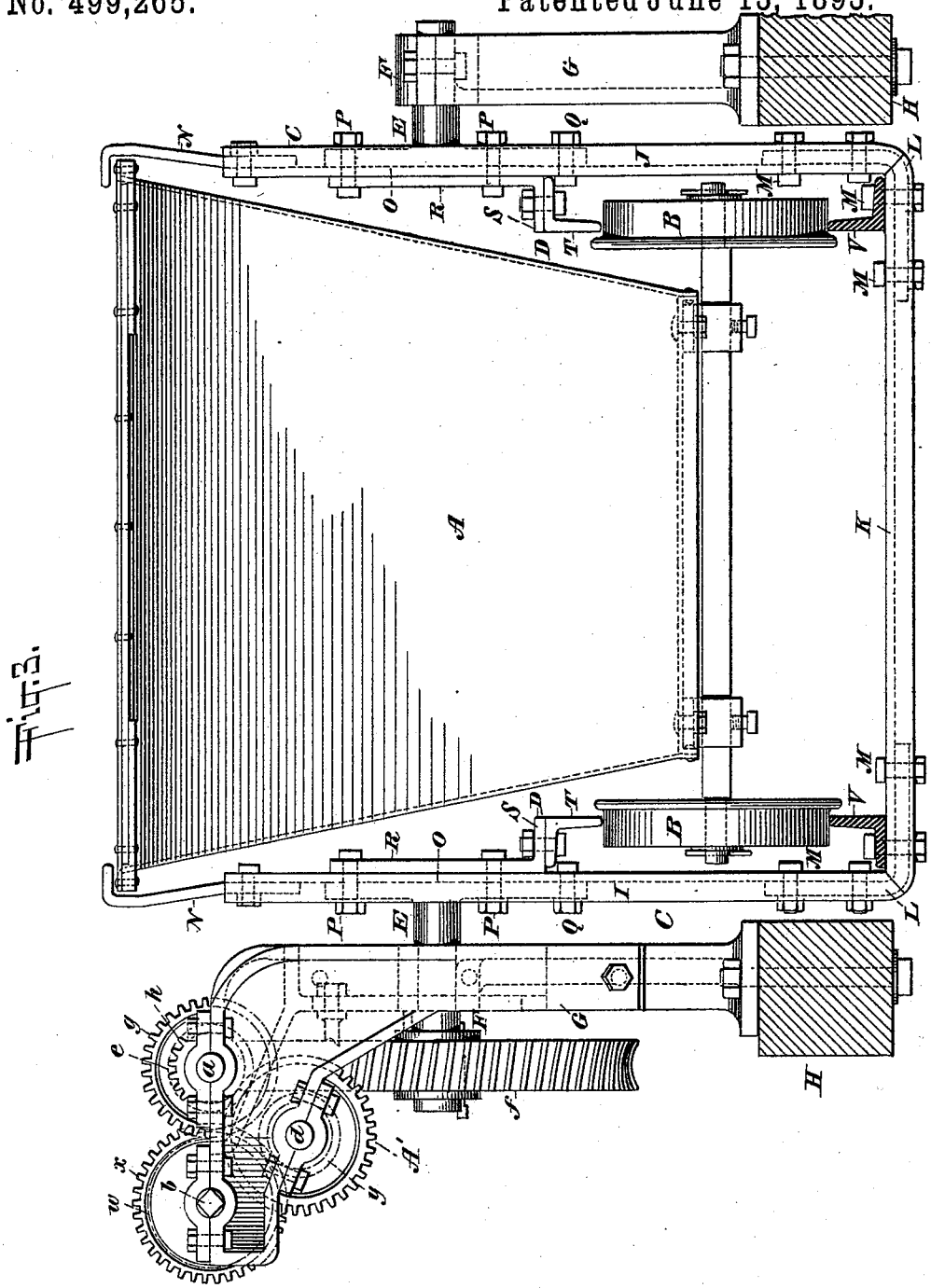
WITNESSES:
Gustave Dieterich
Ed. D. Miller
INVENTOR
George Van Wagenen,
BY
Chas. C. Gill
ATTORNEY.

(No Model.) 4 Sheets—Sheet 4.
G. VAN WAGENEN.
MACHINE FOR DUMPING SUGAR WAGONS.
No. 499,265. Patented June 13, 1893.
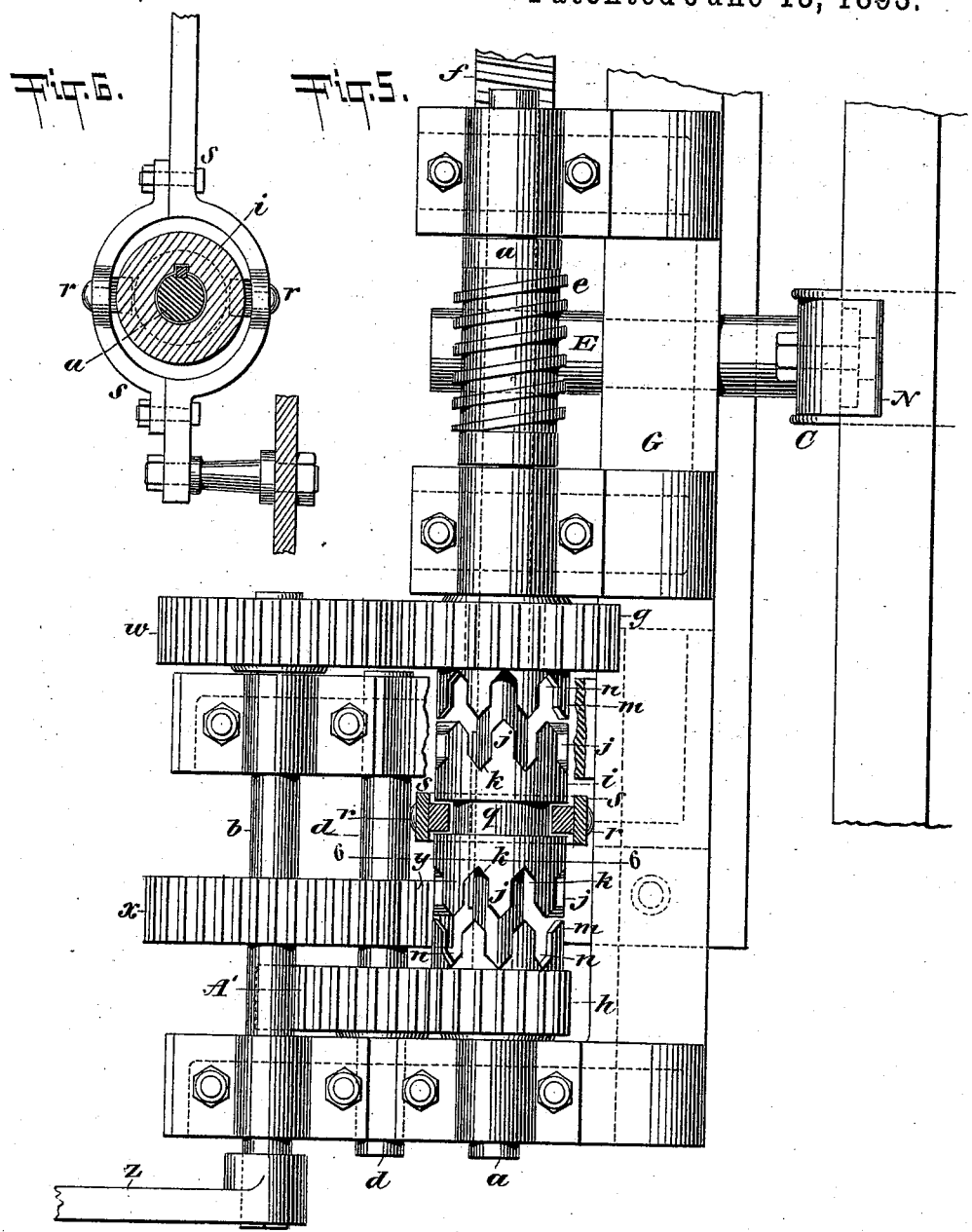

UNITED STATES PATENT OFFICE.

GEORGE VAN WAGENEN, OF NEW YORK, N. Y.

MACHINE FOR DUMPING SUGAR-WAGONS.

SPECIFICATION forming part of Letters Patent No. 499,265, dated June 13, 1893.

Application filed February 2, 1893. Serial No. 460,742. (No model.)

*To all whom it may concern:*

Be it known that I, GEORGE VAN WAGENEN, a citizen of the United States, and a resident of New York, in the county of New York and State of New York, have invented certain new and useful Improvements in Machines for Dumping Sugar-Wagons and other Receptacles, of which the following is a specification.
The invention relates to improvements in machines for dumping sugar wagons and other receptacles, and consists in the novel features of construction and combinations of parts hereinafter described and particularly pointed out in the claims.

In the accompanying drawings I have illustrated the dumping machine made the subject hereof in connection with a sugar wagon of the kind shown and described in Letters Patent of the United States No. 441,264, granted to me on the 25th day of November, 1890. It is well known that the sugar is placed in these wagons while hot and in them allowed to cool, and that thereafter the wagons are moved on tracks to the place at which it is desired to dump the sugar.

My present invention pertains particularly to a machine which will receive the wagons and reverse them in position to dump their contents, and then return them to their former positions preparatory to their being moved away on the tracks. The construction and operation of the said dumping machine will appear in the detailed description hereinafter presented, reference being had to the accompanying drawings, in which—

Figure 1 is a side elevation, partly broken away, of a machine constructed in accordance with the invention, the sugar wagon being shown thereon ready to be inverted in position to dump its contents. Fig. 2 is a like view of same, the wagon and connecting part of machine being shown in their inverted or reversed positions. Fig. 3 is an end view, partly in section, of same, showing the wagon in its returned or upright position. Fig. 4 is a detached vertical section of a part of the machine on the dotted line 4—4 of Fig. 1. Fig. 5 is an enlarged detached top view, partly in section, of the main driving shaft and gearing forming a part of the machine. Fig. 6 is a vertical section of same on the dotted line 6—6 of Fig. 5, and Fig. 7 is a detached face view of one part of the clutch provided on the main driving shaft.

In the drawings A designates the sugar wagon, which is mounted on wheels B adapting it to travel on usual track rails C' and to pass from said rails upon the machine by which it is to be dumped.

The portion of the machine which receives and supports and turns with the wagon consists of the U-shaped frame C and loops D, D, the latter being one at each side of and secured to the frame C, while the latter is supported on the trunnions E, E, mounted in bearings F, F, provided on the main supporting frames G, G, which are secured to the beams H, H, located at opposite sides of the opening through which the sugar is to be dumped.

The frame C is composed of three main flanged or channel bars I, J and K, as shown in Fig. 3, the bars I, J forming the sides of the frame and the bar K the base thereof. At the meeting points of the sides I, J, with the base K are the angle-irons L, L, indicated by dotted lines in Fig. 3, which pass between the edge flanges of said sides and base and are there secured by the bolts M, forming rigid joints and combining with the flanged or channel bars I, J, K, to produce a durable frame adapted to withstand all of the strain to which it would in ordinary use be subjected. At the upper ends of the sides I, J, are bolted the supplemental bars or arms N, having inwardly bent upper ends which extend over and in close proximity to the opposite upper edges of the wagon and serve to aid in holding the wagon during the operation of dumping the latter and returning it to position. The trunnions E, E, are integral with the vertical bars O (shown by dotted lines in Fig. 3) secured to the other face of the sides I, J, of the frame C by bolts P, Q; and on the inner face of said sides and in line with the bars O are secured by said bolts P the bars R having at their lower ends the flanges S to which are bolted the upper angle-iron rails T forming the upper longitudinal section of the loops D, D. The lower longitudinal angle-iron rails V are bolted to the base K of the revoluble frame C, and these lower rails constitute the lower section of the loops D, D. The space between the upper and lower rails T, V, is at one end of the loops left open to admit the wagon wheels, while at the other end of said loops the space between the upper and lower rails is closed by the curved angle-bars W whose ends lap upon and are bolted to the ends of the rails T, V, as illustrated in Figs. 1 and 4. The rails T, V, at the open ends of the loops D, D, are stayed by suitable straps or bars X bolted thereto and located at the outer sides thereof so as not to interfere with the free ingress of the wagon wheels to the loops.

The main supporting frames G, G, will be of suitable form and construction to sustain the trunnions E, E, and furnish bearings for the main driving shaft $a$ and auxiliary shafts $b$, $d$, said shafts being shown more clearly in Figs. 3 and 5. In Figs. 1 and 2 the shafts $b$, $d$, have been broken away or omitted for clearness of illustration. The main shaft $a$ carries the rigid worm $e$ which is in constant engagement with the gear wheel $f$ mounted on the trunnion E, and hence the revolving motion of the shaft is imparted to said trunnion and by it communicated to the frame C, loops D and wagon A. Upon the shaft $a$ are mounted the loose gear wheel $g$, the loose pinion wheel $h$ and the sliding sleeve $i$ the latter being feathered on the shaft between the said wheels $g$, $h$. The sleeve $i$ has upon its opposite ends the series of arms $j$, the opposite sides of whose ends converge, forming tapered or pointed extremities, and corresponding in outline with the recesses $k$ formed in the sleeve at the base of and between said arms. The sleeve $i$ constitutes the movable portion of the clutch the other portions thereof being integral with the wheels $g$ $h$, as shown. Those portions of the clutch formed on the wheels $g$, $h$, consist of the series of arms $m$ and recesses $n$, which, as shown in Fig. 5, correspond in outline with each other and with the arms $j$ and recesses $k$ at opposite ends of the sleeve $i$. The arms $j$ are adapted to seat themselves between the arms $m$ of either the wheel $g$ or $h$, according to the direction the sleeve $i$ is moved in making the engagement. The wheels $g$, $h$, being loose on the shaft $a$ and their clutch arms $m$ and recesses $n$ being tapered, it is evident that the clutch arms $j$ of the sleeve $i$ will readily engage the same, since the tapered ends of the arms $j$ moving against the tapered ends of the arms $m$ would move the wheels $g$, $h$ around the shaft sufficiently to permit a full engagement of said arms, or in other words to permit the ends of the arms $j$ to enter the recesses $n$ and the ends of the arms $m$ to enter the recesses $k$, thus enabling the two parts of the clutch to firmly and fully engage each other at equi-distant points entirely around their circumference and with the minimum extent of movement in the revoluble portion of the clutch. When the sleeve $i$ is caused to engage the gear wheel $g$, the pinion $h$ will be idle, and when the sleeve $i$ is in engagement with the pinion $h$ the gear wheel $g$ will perform no function.

The central portion of the sleeve $i$ is provided with the annular groove $q$ receiving the pins $r$ extending inward from opposite sides of the yoke $s$, which is pivoted to the frame G and carries on its upper end the weight $t$. By moving the weight $t$ to either extreme of its travel, as indicated by dotted lines in Fig. 1, the sleeve $i$ will be moved to secure the engagement of the parts of the clutch and said engagement will be maintained until the attendant throws the weight and yoke in the opposite direction, thus disengaging the sleeve $i$ from, say, the gear wheel $g$ and engaging it with the pinion $h$.

I regard the form of the arms and recesses constituting the engaging parts of the clutch as of importance in machines other than those used for dumping sugar wagons, and hence this part of the invention is not confined to dumping machines, nor is the dumping machine herein described to be limited to the use of the special form of clutch.

Upon the shaft $b$ are the gear wheels $w$, $x$, the former meshing with the gear wheel $g$ and the latter with the pinion $y$ secured on the shaft $d$; and upon the end of the shaft $b$ is applied an ordinary crank-handle $z$ by means of which the attendant will be enabled to rotate the shaft $b$ and gear wheels $w$, $x$. The shaft $d$ has also secured upon it the gear wheel A′ which engages the pinion wheel $h$ on the shaft $a$. Upon power being applied to the shaft $b$ motion will be communicated to the shaft $a$ either through the gear wheels $w$, $g$, or the gear wheels $x$, $y$, A′, $h$, according to whether the clutch sleeve $i$ is in engagement with the wheel $g$ or the wheel $h$, and when the shaft $a$ receives its motion through the gear wheels $w$, $g$, it will rotate in one direction, while it will be caused to rotate in an opposite direction when set in motion by the chain of gears $x$, $y$, A′, $h$, without any reversal in the direction of movement in the shaft $b$ and crank $z$.

In the use of the dumping machine it may be assumed that the wagon containing its load of sugar has been moved from the track-rails C′ upon the dumping frame C, the wheels B of the wagon having passed into the loops D, D, and the upper edges of the wagon being beneath the arms N, as shown in Figs. 1 and 3. The wagon being thus wholly supported by the frame C, the clutch sleeve $i$ will be moved to engage the gear wheel $g$ and power will be applied to the crank $z$ whereupon the motion of the shaft $b$ will be imparted through the gear wheels $w$, $g$, and sleeve $i$ to the shaft $a$, and thence through the worm $e$, gear wheel $f$ and trunnion E to the frame C, the result being that the frame C and the wagon will gradually be inverted in position, as shown in Fig. 2, thus permitting the load of sugar to be discharged. After the sugar has left or while it is leaving the inverted wagon, the attendant will throw the weight $t$ to its opposite position, carrying the clutch sleeve $i$ from the gear wheel $g$ and engaging it with the pinion $h$, whereupon the motion being continued without reversal in the crank $z$ and shaft $b$, the shaft $a$ will through the gears $x$, $y$, $A'$, $h$, and sleeve $i$, receive a reverse motion and this motion being imparted to the worm $e$, gear wheel $f$, trunnion E and frame C, the latter with the wagon will gradually return to its former upright position preparatory to the empty wagon being withdrawn from the loops D and moved away on the track rails $C'$. Thus it will be noted that the wagon will be inverted and returned while the motion of the crank $z$ and shaft $b$ has not been reversed but continued in the same direction.

While the gear wheels $w$, $g$ and clutch sleeve $i$ are engaged in inverting the wagon the other gear wheels will be in motion but perform no function, since the pinion $h$ is loose on the shaft $a$ and will revolve idly thereon; and while the gears $x$, $y$, $A'$ $h$ and sleeve $i$ are securing the return of the frame C and wagon A, the gear wheels $w$, $g$, will rotate but be functionless.

It will be observed that the gear wheels $w$, $g$ are of the same size, and hence the speed of the shaft $a$ during the dumping of the wagon will be the same as that of the shaft $b$, but during the reverse movement of the wagon to its upright position, the speed of the shaft $a$ will be increased owing to the relative proportions of the gears $x$, $y$, $A'$, $h$, and hence the empty wagon will be returned more quickly than it was inverted and much time be saved. The wagons will usually hold about one and one-half tons of sugar and when full, being thus quite heavy, and requiring considerable power to dump them, the movement inverting the wagons will be gradual and slow, but on the return of the empty wagon less power is required and greater speed may with convenience be employed.

The dumping machine above described has been constructed with a view to securing great durability, ease of operation, efficiency and reliability, and the parts of the machine are such that they may be readily understood and put together by the planter and thereafter operated without danger of breakage or necessity for frequent repairs.

The frame C being composed of the parts described above is particularly strong and durable, and for convenience in shipment its sides and base may be separated from each other by the withdrawal of the bolts M. The length of the base K of the frame C will be governed with reference to the width of the wagons to be handled, and the substitution of a longer or shorter base K between the sides I, J, is all that is necessary to adapt the dumping machine to any of the sugar wagons ordinarily used.

What I claim as my invention, and desire to secure by Letters Patent, is—

1. In a machine for dumping sugar wagons and other receptacles, the pivotally mounted frame composed of the vertical flanged side bars I, J having trunnions E, the flanged base bar K, the angle irons L bolted at the meeting ends of said side and base bars and inclosed between the edge flanges thereof, and the extensions having inwardly turned ends at the upper ends of said side bars, combined with the loops D, D, secured to said frame and open at one end to receive the wheels of the wagon, and gearing for rotating said frame; sustantially as and for the purposes set forth.

2. In a machine for dumping sugar wagons and other receptacles, the pivotally mounted frame composed of the vertical flanged sidebars I, J, having trunnions E, the flanged base bar K connecting said side bars, the angle irons L bolted at the meeting ends of said side and base bars and inclosed between the edge flanges thereof, and the extensions having inwardly turned ends at the upper ends of said side bars, combined with the lower angle iron rails V secured to said base-bar, the upper angle iron rails T secured to said side bars, the curved angle bars W overlapping and bolted to the ends of said rails, and gearing for rotating said frame; substantially as and for the purposes set forth.

3. In a machine for dumping sugar wagons and other receptacles, the frame carrying the loops and having trunnions at its opposite sides, combined with gearing substantially as described for dumping the wagon at one speed and returning it at a more rapid speed; substantially as set forth.

4. In a machine for dumping sugar wagons and other receptacles, the frame carrying the loops, and having trunnions, at its opposite sides, combined with gearing substantially as described for inverting and then returning the wagon without reversing the direction of the power shaft; substantially as set forth.

5. In a machine for dumping sugar wagons and other receptacles, the pivotally mounted frame carrying the loops, combined with the gear wheel on the trunnion of the frame, the shaft having the worm engaging said gear wheel, the loose gear wheels on said shaft, the clutch sleeve on said shaft and adapted to engage either of said gear wheels thereon, and the auxiliary shaft connected by gearing with both said wheels; substantially as set forth.

6. In a machine for dumping sugar wagons and other receptacles, the pivotally mounted frame carrying the loops, combined with the gear wheel on the trunnion of the frame, the shaft $a$ having the worm in engagement with said gear wheel, the gear wheels $g$, $h$, and clutch sleeve $i$ on said shaft, the auxiliary shafts $b$, $d$, the gear wheel $w$ on the shaft $b$ and engaging the wheel $g$, the gears $y$, $A'$, on the shaft $d$, and the gear wheel $x$ on the shaft $b$ and engaging the gear $y$; substantially as set forth.

7. In a machine for dumping sugar wagons and other receptacles, the pivotally mounted frame carrying the loops, combined with the gear wheel on the trunnion of the frame, the shaft having the worm in engagement with said gear wheel, the loose gears $g$, $h$, on said shaft, the sliding clutch sleeve on said shaft and adapted to engage either of said wheels $g$, $h$, the pivoted yoke engaging said sleeve and having the weight $t$, and the auxiliary shaft connected by gearing with both of said wheels; substantially as set forth.

8. In a machine for dumping sugar wagons and other receptacles, the pivotally mounted frame carrying the loops, combined with the gear wheel on the trunnion of said frame, the shaft $a$ having a worm in engagement with said gear wheel, the loose gear wheels $g$, $h$, on said shaft and having arms $m$ and recesses $n$, the clutch sleeve $i$ on the shaft $a$ between said loose gear wheels and having at its ends the arms $j$, and recesses $k$, and the auxiliary shaft connected by gearing with both said loose gear wheels; substantially as set forth.

Signed at New York, in the county of New York and State of New York, this 1st day of February, A. D. 1893.

GEORGE VAN WAGENEN.

Witnesses:
CHAS. C. GILL,
ED. D. MILLER.